Feb. 4, 1936.  E. E. STINER  2,029,745
RETRACTABLE STEP FOR VEHICLES AND THE LIKE
Filed June 3, 1935
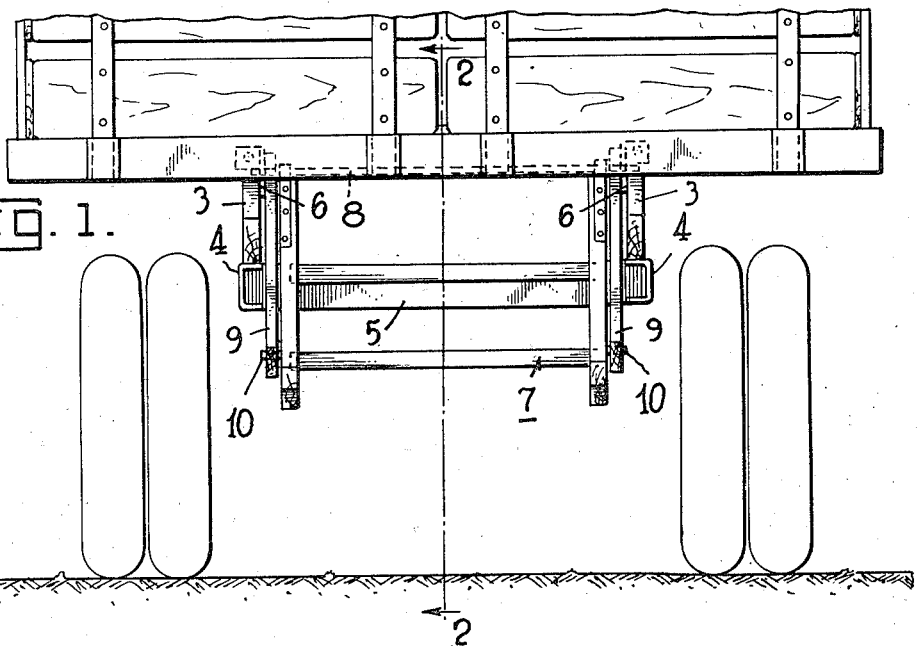
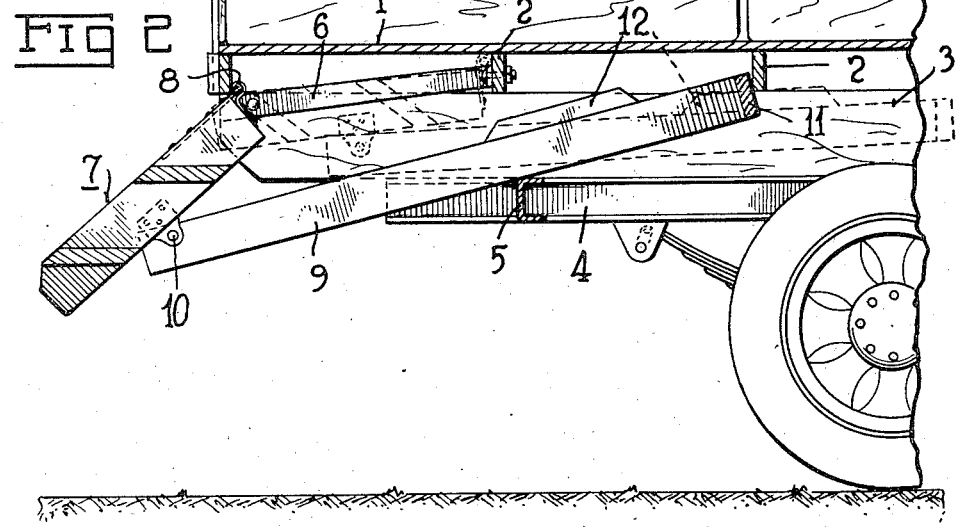
Inventor
Edgar E. Stiner
By Dyre + Kirchner
Attorneys Patented Feb. 4, 1936

2,029,745

UNITED STATES PATENT OFFICE 2,029,745

RETRACTABLE STEP FOR VEHICLES AND THE LIKE

Edgar E. Stiner, Sharps Chapel, Tenn.

Application June 3, 1935, Serial No. 24,755

5 Claims. (Cl. 280—166)

My invention relates to retractable means adapted to be associated with a vehicle body or the like and arranged to be capable of assuming either of two positions, in one position being extended to constitute a step or the like to permit ingress and egress of persons to and from the vehicle body or admission and discharge of inanimate objects, and in the other position being retracted into inoperative position beneath the body of the vehicle or the like so as not to interfere with the normal operation of the latter.

In a particular form of embodiment which I have chosen to illustrate the principles of the invention and have illustrated on the accompanying drawing, which is at present preferred by me, since the same has been found in practice to give satisfactory and reliable results, I associate with a vehicle body such as a truck, a step provided with appurtenant structure capable of maintaining the step in either of the two positions explained above. I wish it to be understood that the broad principles of the invention are of wide application and the structure selected for illustration is capable of being variously modified and rearranged to suit different conditions of use and to achieve varying purposes, all within the broad scope of the spirit of the invention and the appended claims.

The invention will be explained in terms of its embodiment in a vehicle of the truck type having a body adapted to transport goods or passengers. In the use of such trucks difficulty has been frequently encountered in facilitating admission and discharge of passengers and/or of heavy, bulky freight, in the form of barrels, boxes and the like. The bodies of such trucks are commonly provided with side walls, stanchions, or uprights, which become loosened and damaged when repeatedly grasped by troops, laborers and other personnel which the trucks are used to transport. In most of the trucks to which my invention is conveniently applicable such upright body elements constitute the only means by which a passenger can help himself to climb from the ground to the bed of the truck. In some cases attempts have been made to provide a rigid, permanently positioned step at the rear of the truck, but such constructions have not been successful because they leave too little clearance over the roadbed if they are long enough to be of appreciable effect and value. In other cases swinging steps have been tried, but all such constructions, so far as I am aware, have entailed difficulties in providing latching and releasing means which can be readily manipulated without requiring the operator to stoop beneath the vehicle body. Furthermore, most of such attempted solutions of the problem include cumbersome and unwieldy structure, incapable of being sufficiently retracted, and all of them are incapable of being retracted by a person from a position in or on the vehicle.

A primary object of my present invention is to provide a step or the like for the purposes indicated which can be extended low enough to be of real assistance to persons entering or leaving the vehicle and which can be retracted by a person in or on the vehicle, and when retracted will be completely out of the way, giving a clearance over the road surface at least as great as that offered by permanent, original parts of the vehicle structure.

A further object of the invention is to provide a construction of the type indicated which can be inexpensively made and will be extremely rugged, rigid and durable. An additional feature of advantage is the capacity of the structure embodied in my present invention to be installed in any type of truck or other vehicle now in general use without modification, alteration or destruction of any of the permanent, original structure of the vehicle.

Other and further advantages, uses and features of the invention will be apparent from the following description.

In the drawing which accompanies this application and forms part thereof I illustrate a preferred embodiment. In the drawing Figure 1 is an end elevational view of the rear of a truck or other vehicle showing an embodiment of my invention; and Fig. 2 is a vertical cross section taken on the line 2—2 of Fig. 1, showing a step extended in full line position and retracted in dotted line position.

Referring now to the drawing, 1 designates the bed of a truck or the like spaced by cross pieces 2 above side sills 3 supported on longitudinal frame members 4 which are connected and braced by cross members 5. This construction is conventional, being inherent in practically all trucks now in common use, and forms no part of the present invention, although the structure in which I embody the present invention may be designed to take advantage of the conventional truck and body relationship.

In the space beneath the bed 1 of the truck I provide a guideway, conveniently by securing angle iron elements 6, one to the opposed inner surfaces of each of the side sills 3, between the two cross pieces 2 at the rear of the vehicle. Obviously the guideway may be provided in any specifically different form from that which I have chosen to illustrate the invention.

The step assembly 7 is slidably and pivotally engaged with the guideway 6, as through the medium of a transverse pivot bar 8 secured to an end of the assembly. It will be apparent that this relationship of guideway and step assembly permits the latter to be hung from one end of the guideway or to be slid to the other end of the guideway where it may be supported in retracted position in substantial parallelism to the bed 1 of the vehicle.

To support and brace the step assembly in extended position I provide means for holding the assembly at a convenient angle to the bed 1 of the vehicle. The bracing and supporting means may take the form of a pair of struts or equivalent compression members 9 each pivoted at 10 to one side of the step assembly, and connected together by a cross element 11 at their opposite ends. The struts 9 are provided in a length which is sufficient to extend the step assembly 7 at the desired angle when the inner end of each strut, or the cross member which connects the inner ends, engages and bears against one of the cross members 2 which space the body above the supporting sills. Manifestly any other abutment means may be supplied in place of the body spacing element 2, shown in Fig. 2 if the truck or vehicle to which the invention is to be applied includes no element analogous to the cross member 2. An intermediate portion of each strut 9 may rest on the cross member 5 or some equivalent thereof in the running gear frame 4.

It will be evident that with the construction just described extended as shown in full lines in Fig. 2, the step is ready to receive the weight of passengers entering or leaving the vehicle, the weight of persons on the step tread being transmitted longitudinally of the struts 9 to the cross element or other abutment 2. When the step is to be retracted it is simply lifted, an operation easily performed from within the truck, and then slid back into the space beneath the bed 1 by sliding the pivot bar 8 along the guideway 6. When the step assembly is lifted the pivot end of the bracing means 9 moves up with it and the opposite end moves down to clear the cross element or other abutment 2. When the step assembly is slid back into the space beneath the bed 1 the bracing means 9 moves back beneath the abutment 2. In some cases I find it desirable to mount a spacer block 12 on the bracing means to engage the abutment 2 when the step is in retracted position. This serves to bring the retracted bracing means into a more nearly horizontal plane where the friction of the block or blocks 12 and the abutment 2 is ample to maintain the retracted structure against sliding into extended position. I find it convenient also to incline the guideway 6 slightly upwardly from its outer to its inner end, to bring the outer end of the bracing means 9 up to compensate for the lowering of the inner end of the bracing means effected by engagement of the block 12 with the abutment 2.

The construction may be embodied, as shown, in channel iron for the guideway and hard wood timber for the step assembly and bracing means. Of course other materials may be used, the specific materials forming no part of the invention. While I have shown the step assembly as comprising conventional side strings and treads, it will be appreciated that a ramp with or without tread cleats may be substituted therefor in cases where barrels or the like are to be rolled up into the truck body. Similarly, any kind of chute or skidway may be substituted for the step assembly, the particular construction of the latter being no part of the invention.

It is also within the province of the invention to provide hook and eye means, or any other type of latch, to secure the step to a fixed part of the vehicle to maintain the former in retracted position, although I have found such latch unnecessary in practice, the substantially horizontal position of the step assembly and struts, together with the friction of the engaged surfaces of the brace assembly and the abutment or other part of the truck being sufficient to prevent undesired slipping to extended position.

While I have shown the step and its appurtenant members embodied in a truck, it is to be understood that the invention is fundamentally of wide application, being capable of incorporation in any sort of structure, whether a vehicle or a fixed structure, where a retractable step is useful. Thus, it will be appreciated that the construction may be built into a barge or other type of boat or a porch or other fixed building part.

It is to be understood that I have described and shown the invention as embodied by means of specifically formed elements specifically related to accomplish the objects and purposes explained hereinbefore. This showing and description is by way of exemplification merely, and not limitation. Other and further embodiments of the invention are contemplated by me, and all such modifications, to the extent that they are within the spirit of the invention as defined by the appended claims are to be deemed within the scope and purview thereof.

I claim:

1. In combination with a vehicle or the like having a body and a generally horizontal space beneath the body, a step assembly, means connecting the step to the vehicle comprising guide means on the vehicle and an element carried by the upper end of the step assembly slidable in said guide means whereby the step may be slid into said space or extended therefrom and rotated so as to depend in extended, operative position from the vehicle, and bracing means pivotally connected to the lower end portion of the step and adapted to bear against a fixed part of the vehicle for limiting said rotation and supporting the step in extended position.

2. In combination with a vehicle having a running gear frame and a body spaced above said frame, a retractable step assembly, a guideway mounted in the space between the frame and the body, and a pivot pin carried by the upper end portion of the step and slidably engaged with the guideway whereby the step may be dependently extended from the outer end of the guideway or be retracted in substantially horizontal position in said space by sliding the pivot pin to the other end of the guideway, and bracing means having one end pivoted to the lower end portion of the step assembly and having its other end movable into engagement with a fixed part of the vehicle, when the step assembly is extended, to transmit thrust from the lower part of the step assembly to said fixed part of the vehicle.

3. In a vehicle or the like, a retractable step assembly, guide means mounted on the vehicle, an element carried by the upper end of the step assembly and slidable along the guide means, a strut pivoted at one end to the lower part of the step assembly, an abutment provided on the vehicle for the other end of the strut, and means comprising a fixed part of the vehicle for directing the strut against said abutment when the step assembly is extended and in operative position.

4. In combination with a vehicle having a frame including a cross member, and side sills supported on the frame and supporting a body, a retractable step assembly, a pair of spaced guide channels mounted in planes substantially parallel with those of the side sills, a pivot at the upper end of the step assembly slidably engaged with the guide channels, and a pair of bracing struts pivoted at one end to the lower part of the step assembly, supported in their intermediate portions by the cross member of the frame, and adapted, when the step assembly pivot is positioned at the outer end of the guide channels and the step assembly is dependently extended therefrom, to bear against a part of the vehicle and brace the step assembly in its extended position.

5. In combination with a vehicle or the like having a body and a generally horizontal space beneath the body, a step assembly having straight sides, a pivot pin carried by the upper end of the step assembly, a guideway carried by the vehicle slidably receiving the pin whereby the step assembly may be retracted into said space or extended therefrom and then rotated around the pivot pin to depend therefrom, and a compression member pivoted to the lower part of the step assembly and extending from the under side thereof to brace the step assembly against a part of the vehicle when the step assembly is in extended position.

EDGAR E. STINER.